Patented Nov. 19, 1935

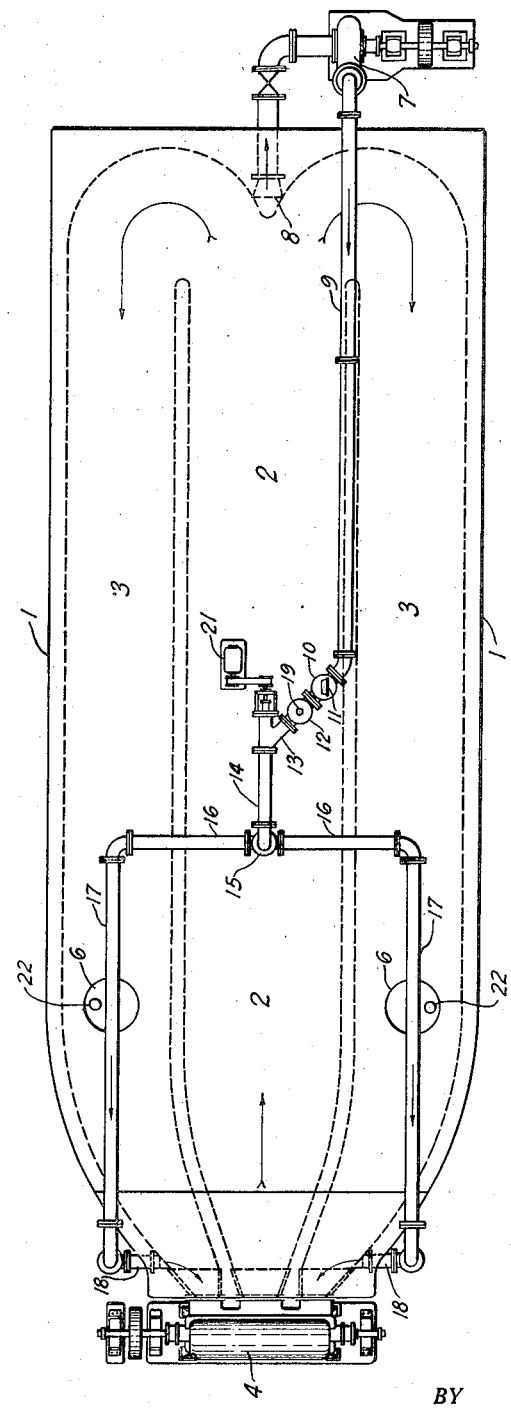

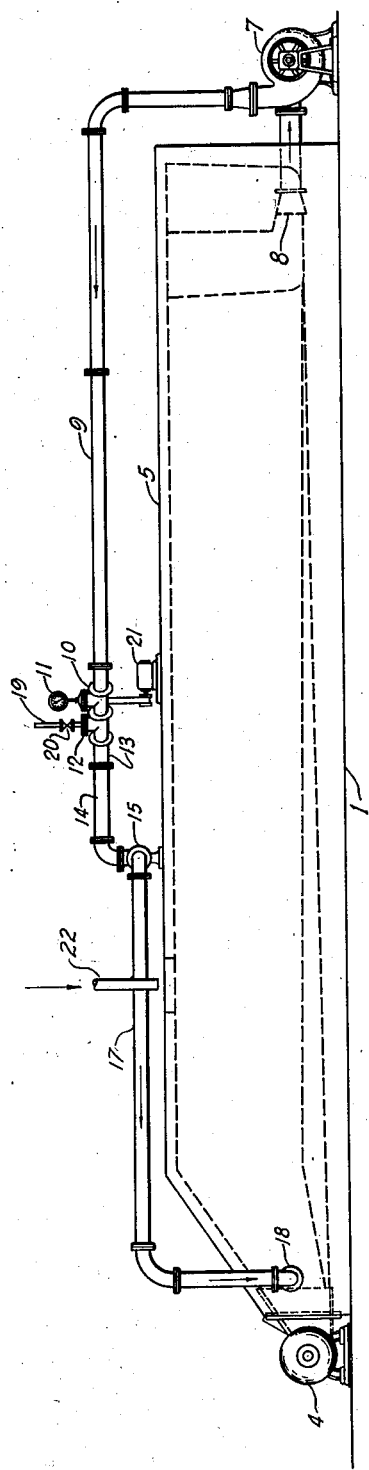

2,021,612

UNITED STATES PATENT OFFICE 2,021,612

PULP TREATING PROCESS

James S. Sconce, Niagara Falls, N. Y., assignor to Hooker Electrochemical Company, New York, N. Y., a corporation of New York Application February 19, 1934, Serial No. 711,923

10 Claims. (Cl. 8—2)

My invention relates more particularly to processes for reacting the halogens with materials in aqueous suspension wherein, by the action of the halogen upon the water and upon the material itself, there is formed an acid of the halogen. A typical application of my invention is to the chlorination of cellulosic material, as in the treatment of paper pulp for the purpose of delignification, preliminary to bleaching the same.

In my co-pending application Serial No. 686,367 there is disclosed a process for chlorination of cellulosic material in aqueous suspension, in the absence of hypochlorites, which are known to injure the cellulose, and while protecting the material and walls of the reaction chamber from the acids formed by reaction of the chlorine with the water and with the material itself. The present invention has for its object to effect economies in the process of my co-pending application referred to and overcome certain difficulties experienced in carrying it out, which I will now describe.

In my said application it is shown that when chlorine is injected into water the following reaction takes place:

(1) $Cl_2 + H_2O = HClO + HCl$

However, if more chlorine is injected this reaction does not continue indefinitely, but a point is very soon reached at which the chlorine ceases to react with the water and begins to go into solution as elemental chlorine. If the injection of chlorine is continued when the chlorine in solution has reached 0.3 to 0.5 per cent it ceases to go into solution and merely bubbles through the water. By neutralizing the HCl formed as above, however, the chlorine in solution may be increased to 1 per cent or slightly more.

If for the purpose of neutralizing the HCl as formed by injection of chlorine into water an alkali, such as caustic soda or lime, is used and if the alkali is in excess of the quantity required to neutralize HCl the following typical reactions will occur:

(2) $NaOH + HClO = NaClO + H_2O$
(3) $2NaOH + Cl_2 = NaClO + NaCl + H_2O$
(4) $Ca(OH)_2 + 2HClO = Ca(ClO)_2 + 2H_2O$
(5) $2Ca(OH)_2 + 2Cl_2 = Ca(ClO)_2 + CaCl_2 + 2H_2O$
(6) $Na_2CO_3 + HClO = NaClO + NaHCO_3$
(7) $2Na_2CO_3 + Cl_2 + H_2O$
    $= NaClO + NaCl + 2NaHCO_3$

In each of these reactions one of the products is a hypochlorite, or in other words, a compound capable of oxidizing or bleaching. But it has already been stated that my present process has for its primary object, not a bleaching, but a delignification preliminary to bleaching. It has been found that prolonged exposure of cellulose to bleaching agents is very injurious to it. Therefore for the purpose of my process it is desirable to neutralize the HCl by means of a salt that will not react with HClO or chlorine to form hypochlorites. For this purpose therefore I employ preferably calcium carbonate. This does not react with chlorine or ClO at all. It does, however, react with HCl in accordance with the following equations:

(8) $2CaCO_3 + 2HCl = CaCl_2 + Ca(HCO_3)_2$
(9) $Ca(HCO_3)_2 + 2HCl = CaCl_2 + 2H_2CO_3$
(10) $H_2CO_3 = H_2O + CO_2$

The above reactions represent stages, the final result of which may be written.

(11) $CaCO_3 + 2HCl = CaCl_2 + H_2O + CO_2$

Therefore, by the admixture of $CaCO_3$ with the material to be chlorinated I neutralize the HCl, thus protecting the walls of the reaction chamber as well as the material itself and at the same time avoid the production of hypochlorites and greatly increase the solubility of the chlorine in the water suspension, thus correspondingly accelerating the chlorination of the pulp. There is, of course a relatively small quantity of HClO present and this exercises some bleaching effect, but the quantity of chlorine present in this form is small compared with the elemental chlorine present in solution. This is of utmost importance as elemental chlorine acts selectively and chlorinates principally the lignin, which may afterwards be washed out. After thus removing most of the lignin, the remainder may be bleached in a subsequent operation in known manner without injury to the cellulose.

The process as heretofore described is that of my co-pending application above mentioned. In the carrying out of this process I have found, however, that the $CO_2$ formed as one product of reactions (8) to (11) tends to float the pulp to the surface of the water suspension, where it lags behind in the circulating stream, so that after a time the pumps will be circulating mostly water. To overcome this difficulty I find that it is only necessary to add sufficient lime to react with the $CO_2$ and reconvert it to $CaCO_3$ in accordance with the reactions:

(12) $Ca(OH)_2 + CO_2 = CaCO_3 + H_2O$
(13) $CaO + CO_2 = CaCO_3$

If there should be any $H_2CO_3$ or $Ca(HCO_3)_2$ in solution these will likewise be converted to calcium carbonate in accordance with the following reactions:

(14) $Ca(OH)_2+H_2CO_3=CaCO_3+2H_2O$
(15) $CaO+H_2CO_3=CaCO_3+H_2O$
(16) $Ca(OH)_2+Ca(HCO_3)_2=2CaCO_3+2H_2O$
(17) $CaO+Ca(HCO_3)_2=2CaCO_3+H_2O$

It might be supposed that this lime would cause the formation of the hypochlorites that it is desirable to avoid, but if the pH of the solution be kept below 7 reactions (4) and (5) cannot take place.

It will be observed that reactions (12) to (17) amount to a regeneration of the calcium carbonate, so that it is possible to start with a small quantity of calcium carbonate and continue with lime. The advantage of this procedure is threefold, i.e., (a) the flotation difficulty is overcome, (b) the process is cheapened and (c) the process is accelerated and the results improved, since the regenerated carbonate is precipitated and therefore much finer than any commercial ground calcium carbonate; moreover, it is precipitated in situ and therefore more evenly distributed than the ground material.

In the carrying out of this process I first add a small amount of finely ground calcium carbonate to a dilute suspension of pulp in water. Chlorine is then injected until $CO_2$ begins to be liberated. This can be readily noted, or it can be anticipated by titration. Lime, either as CaO or $Ca(OH)_2$ is then added to convert the $CO_2$, $H_2CO_3$ or $Ca(HCO_3)_2$ to $CaCO_3$. The injection of chlorine and addition of lime is continued until the desired amount of chlorine has been added. During this time the pH of the suspension at the point where the lime is added must be kept between 3.8 and 7. This is done by regulating the proportion of lime to the chlorine added. Above pH 7 hypochlorites will be formed.

It will be seen that the calcium carbonate acts as a buffer, so that a small quantity of carbonate makes it possible to use a large quantity of lime without formation of hypochlorites or injury to the cellulose.

Various types of apparatus may be employed in the carrying out of my process. For example, the type of apparatus illustrated in co-pending application Serial No. 666,536, may be used. In this case the circulating tank known as a "bellmer" is illustrated. As most paper manufacturing plants are already equipped with bellmers, I will further describe my process as applied to this type of equipment.

Example:
1. 4000 lbs. of oven dried pulp of 2.5 per cent consistency was introduced into a bellmer.
2. 300 lbs. of calcium carbonate of below 100 mesh was added and thoroughly mixed with the pulp.
3. Chlorine was injected into the pulp starting at a rate of 1 lb. per minute and increasing to 5 lbs. per minute until 630 lbs., or about 15 per cent of the weight of pulp, had been introduced.
4. After the first 100 lbs. of chlorine had been introduced lime was added at approximately the same rate as the chlorine (i.e. pound for pound) until the end of the chlorination. The total lime added was therefore 530 lbs. The resulting pH ranged between 4 and 6.
5. After introduction of the chlorine and lime had been completed, the pulp was washed and subjected to the usual hypochlorite bleaching.

The color of the product was comparable with that of commercially bleached soda pulp (light cream color) and the strength notably higher than that of kraft pulp of equal whiteness bleached by known single stage hypochlorite methods.

In order to improve the mixing of the chlorine with the pulp it was desired to adapt the highly efficient apparatus of the above mentioned co-pending application, Serial No. 547,755, to the bellmer type of chlorination. The pulp was therefore by-passed through a pump, as illustrated in the drawings, in which Fig. 1 is a plan view of a bellmer adapted to my process, and Fig. 2 is a side elevation of the same.

Referring to the figures, 1 is the bellmer, consisting of a concrete body formed with a central passage 2 and side return passages 3, 3 in which the pulp is circulated in the direction of the arrows by means of the pump 4. The bellmer 1 is covered over by a concrete slab 5 through which are formed the openings 6, 6. The intake of pump 7 is connected through the end wall of the bellmer, preferably at the point 8 where the pulp stream divides. The discharge from pump 7 passes through T 10, where a pressure gauge 11 is connected to the line, followed by T 12, where chlorine is introduced. From T 12 the stream passes through Y branch 13, through mixer pipe 14 and T 15, where it divides. From T 15 the two streams pass through mixer pipes 16, 16, which are constructed in accordance with the disclosure of co-pending application Serial No. 695,876. After passing mixer pipes 16, 16 the two streams are led through pipes 17, 17 and reintroduced through the side walls of the bellmer at points 18, 18.

The chlorine is introduced into T 12 from pipe 19 and its flow is controlled by means of needle valve 20. The source of chlorine is ordinarily a standard commercial chlorine tank car (not shown).

From the point of admission of the chlorine onward the piping is rubber lined. It has heretofore been usual, in carrying on chlorination operation in bellmers, to protect the concrete and metal of the circulating pump by means of a coating of special varnish. In my present process, this is unnecessary, as the pulp suspension is never allowed to become sufficiently acid to attack either concrete or the steel of the pump.

If desired a mixing paddle may be introduced into the Y 13 and driven by motor 21, in order to give an instantaneous preliminary mixing to the chlorine and pulp.

The calcium carbonate and lime are introduced through openings 6. The latter may be in the form of milk of lime, in which case it may be introduced continuously through a pipe as at 22.

It will be noticed that in this type of apparatus there will be found zones in which successive stages in the process will be continuously taking place. Thus, immediately beyond the point of injection of the chlorine at T 12 reaction (1), also the pulp chlorination and bleaching reactions, will be taking place very vigorously. At point 18 the freshly chlorinated and strongly acid pulp comes into contact with calcium carbonate. From there on reactions (8) to (11) begin to take place, while the chlorination of the pulp continues. The velocity of circulation is such that by the time the pulp has returned to a point beneath openings 6 these reactions have gone to substantial completion. At this point the pH should be about 4. Lime is then added to bring the pH up to 6. Reactions (12) to (17) then take place and the calcium carbonate is regenerated.

The capacity of pump 7 is preferably such that the entire contents of the bellmer pass through the pump several times during the injection of the chlorine. It is not essential, however, that such a pump be used, as the chlorine may, if preferred, be injected into the bellmer directly at points 18 as illustrated in my copending application, Serial No. 686,367. The injection of the chlorine into a more rapidly circulating stream by-passed from the main stream has, however, the advantage that the chlorine may be injected much more rapidly without complications.

Although I prefer to apply my process to a circulating stream of pulp, it is applicable to pulp in a container of any shape provided it is equipped with adequate agitation. The chlorine and milk of lime may enter the suspension at substantially the same point, provided the quantities are so proportioned that the suspension remains acid. In this case the reaction may be written as follows:

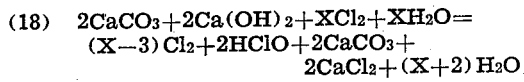

(18)  $2CaCO_3+2Ca(OH)_2+XCl_2+XH_2O=$
      $(X-3)Cl_2+2HClO+2CaCO_3+$
      $2CaCl_2+(X+2)H_2O$

It will be seen that the $CaCO_3$ appears on both sides of this equation. That does not signify that it does not enter into the reaction, but rather that it is continually regenerated. Its presence is necessary to my purpose, for otherwise it would be impracticable to regulate the supply of lime so as to prevent the formation either of hypochlorites, on the one hand, or, on the other hand, free HCl. As already stated, the function of the $CaCO_3$ is to act as a buffer and thus avoid necessity for fine regulation of the lime.

By means of the simple apparatus just described, which can be easily applied to any bellmer, my process is rendered applicable to practically any existing plant throughout the country, with a very small investment. By this means kraft pulp can be bleached to any desired degree of whiteness without sacrifice of its unique strength characteristics.

What I claim is:

1. The process of treating a water suspension of cellulosic material which comprises reacting thereon with elemental halogen in the presence of calcium carbonate and lime said lime proportioned to said halogen to maintain a non-alkaline condition in the suspension.

2. The process of treateng a water suspension of cellulosic material which comprises reacting thereon with elemental chlorine in the presence of calcium carbonate and lime, said lime proportioned to said chlorine to maintain the pH of the suspension below 7.

3. The process of delignifying wood fiber in a water suspension which comprises injecting chlorine into the suspension in the presence of calcium carbonate and lime, said lime proportioned to said chlorine to maintain the pH of the suspension between 3.8 and 7.

4. The process of chlorinating wood fiber in a water suspension which comprises injecting chlorine into the suspension in the presence of calcium carbonate and lime until the desired quantity of chlorine has been added to the suspension, said lime proportioned to said chlorine to maintain a non-alkaline condition in said suspension circulating the suspension until the desired chlorination effect has been obtained and washing.

5. The process of chlorination of wood pulp in a water suspension which comprises mixing a relatively small quantity of calcium carbonate with said pulp, injecting chlorine into said suspension until the pH thereof approaches 3.8 then adding lime thereto and continuing the injection of chlorine until the desired quantity has been added, while simultaneously adding lime to maintain the pH of the suspension betwen 3.8 and 7.

6. The process of chlorinating cellulosic material in a water suspension which comprises mixing finely divided calcium carbonate therewith, injecting chlorine into the suspension and after a time interval sufficient to allow said chlorine to react with said material and said carbonate, adding sufficient lime to the suspension to regenerate the carbonate and continuing the injection of chlorine until the desired quantity has been injected while simultaneously adding lime in quantity proportioned to the chlorine to regenerate the carbonate without at any time forming calcium hypochlorite.

7. The process of chlorinating cellulosic material in a water suspension which comprises mixing finely divided calcium carbonate therewith, circulating the same, injecting chlorine at one point in the circulating suspension and at another point sufficiently removed from said first mentioned point to permit the chlorine to react with the material and calcium carbonate adding lime to the suspension in amount sufficient only to regenerate the calcium carbonate, without forming calcium hypochlorite.

8. The process of chlorinating cellulosic material in a water suspension which comprises mixing finely divided calcium carbonate therewith, circulating the same, by-passing a minor proportion thereof at relatively high velocity, injecting chlorine into said minor proportion and adding lime to the suspension in amount sufficient only to regenerate the calcium carbonate, without forming calcium hypochlorite.

9. The process of chlorinating cellulosic material in a water suspension which comprises mixing finely divided calcium carbonate therewith, circulating the same, diverting a minor proportion thereof at relatively high velocity, injecting chlorine into said minor proportion, thoroughly mixing said chlorine with said minor proportion, returning said minor proportion to the main circulating suspension and adding lime to said suspension in amount sufficient only to regenerate the calcium carbonate without formation of calcium hypochlorite.

10. The process of chlorinating wood pulp in a water suspension which comprises mixing with the pulp approximately 7½ per cent of its weight of calcium carbonate, circulating the suspension, injecting chlorine therein until the pulp begins to give indications of gas flotation and thereafter continuing the injection of chlorine, while adding lime in amount sufficient to prevent gas flotation but insufficient to cause a hypochlorite bleaching effect, until the total weight of chlorine to give the desired chlorination effect has been injected.

JAMES S. SCONCE.